United States Patent Office 2,807,643
Patented Sept. 24, 1957

2,807,643
PREPARATION OF AROMATIC ACIDS AND SALTS THEREOF

James Hartley, Whitby, Wirral, England, assignor to Shell Development Company, Emeryville, Calif., a corporation of Delaware No Drawing. Application January 11, 1954, Serial No. 403,445

Claims priority, application Great Britain February 9, 1953

4 Claims. (Cl. 260—520)

This invention relates to a process for the preparation of alkyl-substituted hydroxy aromatic carboxylic acids and salts thereof and more particularly to the preparation of such acids and salts in a continuous manner by the carboxylation of alkali metal phenates.

As used in this specification, the term "phenol" is intended to include within its meaning both mononuclear and polynuclear phenols such as phenol and the naphthols. The term "phenate" likewise is intended to include the alkali metal salts of these phenols, both mononuclear and polynuclear. When a structural formula of any particular phenol or phenate is given, unless otherwise specifically stated, the citation is intended to be illustrative only and is not to be considered in any way restrictive in character.

The reaction of anhydrous alkali metal phenates with carbon dioxide to produce the corresponding alkali metal salts of hydroxy aromatic carboxylic acids was discovered by Kolbe, who passed carbon dioxide over the heated alkali metal phenate. Many proposals, all designed to facilitate this reaction, have since been made. All of these proposals have involved the use of processes carried out in a batchwise manner and no practical process for effecting the carboxylation in a continuous manner has been disclosed. Operation in a batchwise manner possesses inherently substantial disadvantages for it is inevitable when operating in a batchwise manner that individual batches will react differently and to different degrees, thus requiring a separate purification step in order that a product of the desired uniform composition can be obtained. Furthermore, batchwise operation, as compared to continuous operation, requires large quantities of man-power and the production rate is relatively low. Operation in a continuous manner could solve these problems, resulting in the production of a product of uniform composition in larger quantities and with less labor from the same investment in equipment and raw materials.

Again, all of the prior art processes teach that the desired reaction must be carried out in a single reaction vessel, all of these processes emphasizing the necessity for maintaining an anhydrous reaction system and obtaining and maintaining intimate contact between the carbon dioxide and the phenate. The latter requirement is usually met by conducting the reaction at elevated pressures (thus increasing the solubility of the carbon dioxide in the reaction system) and by the use of mixers, stirrers, packed columns, or other mechanical devices to insure thorough mixing of the gas-liquid system. Many of these processes insure the presence of a liquid phase in the reaction zone through the use of one or more solvents. These methods of meeting the necessary requirements for insuring efficient conduct of the reaction in many cases have the undesirable result that the reaction is carried out in a non-homogeneous liquid-gas-solid system, for in the usual case the final product—the aromatic hydroxy carboxlate—is insoluble in the reaction mixture. This non-homogeneity of the reaction system leads to several undesirable results. The efficiency with which the desired reaction may be conducted is lowered because the solid phase interferes with solution of gaseous carbon dioxide and prevents to a substantial degree the necessary intimate liquid-gas contact. The liquid-solid-gas system also requires a large amount of power to insure intimate contact when stirrers or mixers are used. When packed columns or like mechanical devices are employed there tends to occur clogging, channelling, or slugging, resulting in poor contact between the gas and the liquid. Further, the solid, being rather dense, tends to settle out of the reaction zone when mixing ceases and to cause plugging of lines and valves.

It is therefore the primary object of the present invention to solve these problems by providing a continuous method for the preparation of alkyl-substituted hydroxy aromatic carboxylic acids or their salts in practical yield, said method being simple in operation and requiring a minimum of equipment investment, power, and labor. Other objects will become apparent from the disclosures and claims forming a part of the present application.

It has now been discovered that all of the undesirable results arising from the practice of the prior art processes may be overcome and the desired carboxylation reaction effected in a simple and continuous manner by the use of a two-stage reaction system. In a first stage carbon dioxide is absorbed into a substantialy anhydrous solution of the alakli metal phenate in a neutral or basic non-hydroxyl-substituted organic liquid. The desired carboxylation reaction is effected in a second stage by passing the reaction mixture through a liquid-full reactor in a non-turbulent manner, it being a feature of the method that no carbon dioxide separates from the solution to form a gas phase in this second, reaction stage. Thus, the intimate contact between the reactants necessary to effect the desired reaction in an efficient manner is accomplished in a reaction system containing no interfering solid and the desired reaction is accomplished in a manner which requires no stirring or other agitation. The net result is a practical continuous process for producing the valuable alkyl-substituted hydroxy aromatic carboxylic acids.

The phenols whose alkali metal salts are used as starting materials in the process of the invention may be any mononuclear or polynuclear aromatic compound containing at least one hydroxyl group substituted in the aromatic nucleus and may carry other nuclear substituents, such as hydrocarbon radicals, halogen atoms, amino groups, nitro groups, ether groups and carboxylic or sulfonic acid groups, provided such substitutents are not substituted in such positions on the nucleus as to prevent the carboxylation reaction. Examples of suitable phenols are phenol, alkyl phenols such as o-, m- and p-cresols, and mixtures thereof, alkyl phenols obtained by alkylating a phenol with one or more alcohols, alkyl halides, ethers or olefins, respectively, such as p-hexyloxyphenol and o-isopropylphenol; halogen-substituted phenols, nitrophenols, aminophenols, 1- and 2-naphthol, 5, 6, 7, 8-tetrahydro - 2 - naphthol, halogen - substituted naphthols, nitronaphthols, aminonaphthols, 2 - hydroxydiphenyl, 4-hydroxydiphenyl, p - benzylphenol, 1 - anthrol, 2 - anthrol, 1,2- and 1,4 - dihydroxybenzene, and 1,2- and 1,5 - dihydroxynaphthalene. A preferred group of these phenols are mono- or dialkyl phenols obtained by alkylating a phenol with olefins containing from 8 to 18 carbon atoms per molecule, obtained by cracking petroleum fractions.

The alkali metal constituent of the alkali metal phenate employed in the process of the invention consists of any metal of group IA of the periodic table of the elements. However, sodium and potassium are preferred as the alkali metal constituent in view of their wide availability and relatively low cost as compared to the other metals of group IA.

If desirable, mixtures of the phenates, that is, mixtures of the sodium and potassium salts of the same phenol, or mixtures of the phenates in which the alkali metal is the same but in which the organic components differ, may be employed instead of a single phenate.

The metallic constituent of the alkali metal reactant—e. g., the alkali metal hydroxide or alkoxide or alkali metal—also consists of any metal classified in Group IA and either potassium or sodium is preferred as the alkali metal constituent for the same reasons stated above. The alkali metal alkoxide, if such be used, may be derived from an aliphatic alcohol, preferably an alcohol containing from 1 to about 4 carbon atoms in the molecule. Of this class the most desirable member is methanol. If found desirable, the alkali metal reactant may consist of mixtures of alkali metals or of mixtures of alkali metal hydroxides or of alkali metal alkoxides.

The conversion of the phenol into the substantially anhydrous alkali metal phenate employed as the starting material in the first stage of the process of the invention may be effected by any one of the various methods known in the art of preparing anhydrous alkali metal salts of acidic organic compounds. Thus, the phenol in solid or in molten state, or in solution or suspension in a suitable liquid, may be reacted with the alkali metal, alkali metal hydroxide or alkali metal alkoxide which is in the solid state, or in solution or suspension in a suitable liquid. If necessary, any water or alcohol formed is removed from the reaction mixture and any liquid reaction medium may also be removed. One convenient and economic method of preparing the alkali metal phenate comprises dissolving the phenol in a concentrated aqueous solution of the equivalent amount of alkali metal hydroxide and dehydrating the reaction mixture by heating with agitation under reduced pressure, usually at 150° C. to 160° C. to give the solid salt. The aqueous reaction mixture may also be dehydrated by azeotropic distillation in the presence of toluene, xylene or other organic liquid which forms the necessary azeotrope with the components of the reaction mixture. Alternatively a solution of the phenol in a suitable volatile organic solvent may be reacted with the equivalent amount of alkali metal hydroxide, also dissolved in a suitable volatile organic solvent, the solid phenoxide then being obtained by distilling off water and solvent from the reaction mixture. A lower aliphatic alcohol, for example, methanol, is a suitable solvent for this purpose. An entrainer may be added to facilitate the removal of water and solvent.

Instead of the alkali metal hydroxide, a solution of an alkali metal alkoxide in a lower aliphatic alcohol, preferably a lower aliphatic alcohol containing from 1 to 4 carbon atoms per molecule, may be used. Preferably, the alkali metal alkoxide is derived from the same alcohol as is used as solvent. Methyl alcohol is preferred for this purpose. The solid alkali metal phenate may be obtained by removing the organic solvent by distillation, if necessary, under reduced pressure.

In the process of the invention the carboxylation is effected by reacting carbon dioxide with an alkali metal phenate in a system wherein the phenate is present in the form of an essentially anhydrous solution in a neutral or basic organic liquid containing no hydroxyl group substitution. The aromatic hydrocarbons such as benzene, toluene, xylene or commercially available mixtures of xylenes, ethyl benzene and cumene are very suitable organic liquids for this purpose. Other hydrocarbons which may be used are the aliphatic hydrocarbons such as heptane, octane, decane, kerosene, gas oil, technical white oils, cyclohexane, methylcyclohexane and the tetra- and deca-hydronaphthalenes.

Suitable ketones which may be used in the process of the invention are the dialkyl ketones such as methyl ethyl ketone, ethyl n-butyl ketone, diethyl ketone, di-isopropyl ketone, di-isobutyl ketone, di-sec-butyl ketone, 2-octanone, di-n-butyl ketone, butyl n-hexyl ketone, pinacoline, cyclopentanone and acetophenone.

The ethers which may be used in the process of the invention may be acyclic or cyclic ethers. Suitable ethers are the aliphatic ethers such as di-isobutyl ether, ethyl amyl ether, ethyl n-butyl ether, ethyl n-hexyl ether, ethyl n-heptyl ether, cyclic ethers such as 1,3-dioxane, 1,4-dioxane, 1,4-dioxene, 2-methyl-1,3-dioxane and aromatic ethers such as anisole and phenetole.

Suitable basic liquids for use in the process of the invention are the aliphatic primary, secondary or tertiary amines, or mixtures thereof, such as n-amylamine, n-heptylamine, 2-amino-n-heptane, dipropylamine, triethylamine, tripropylamine, carbocyclic amines such as aniline and heterocyclic nitrogen compounds, such as pyridine, piperidine, the picolines, lutidines and collidenes and quinoline and its homologs.

The anhydrous solution or suspension of the alkali metal phenoxide in the neutral or basic organic liquid used in the process of the invention may be obtained by any of the methods commonly employed in the art for preparing anhydrous solutions or suspensions of salts of organic acids in organic liquids.

Thus, the anhydrous alkali metal phenoxide solution or suspension in the neutral or basic organic liquid may be prepared directly by adding the alkali metal to the solution of the phenol or alternatively it may be prepared as an integral part of the process whereby the alkali metal phenate is prepared. A process whereby the phenate is formed in a homogeneous medium and the final product is a solution of the phenate in the kind of solvent found most desirable for use in the process of the present invention is disclosed in copending application Serial No. 370,887, now abandoned. This application discloses a process for preparing an anhydrous solution of an alkali metal phenate in a neutral or basic organic solvent such as xylene, which solution provides an especially desirable system in which to conduct the carboxylation of the phenate. This process briefly described comprises mixing the phenol with a solution of an alkali metal hydroxide in a lower aliphatic alcohol preferably one containing from 1 to about 4 carbon atoms and most desirably ethanol, distilling a major portion of the alcohol from the resulting solution, thereafter adding a neutral or basic organic solvent having a boiling point substantially above that of the alcohol used and distilling off the residual alcohol and any remaining water together with a part of the added neutral or basic solvent. As the neutral or basic solvent there may be used, for example, the hydrocarbon, ether, ketone, amine, or heterocyclic compounds heretofore described, the preferred solvents again being aromatic hydrocarbons or mixtures thereof, such as the xylenes and mixtures of xylenes.

The novel process of the invention comprises two stages or steps. In the first stage the intimate contact between the reactants necessary to effect the desired reaction is obtained by absorbing the carbon dioxide in the anhydrous solution of the phenate. This solution is then continuously transferred to a reactor where under nonturbulent conditions and in the absence of any gas phase the reaction is carried to completion. The absorption may be carried out physically in any manner that satisfies the requirements stated above. For example, the solution may be passed down a packed column while carbon dioxide is passed in a countercurrent manner toward the top of the column. An alternative procedure involves the use of a closed reaction vessel equipped with a gas dispersion apparatus or a high-speed stirrer by means of which the gaseous carbon dioxide may be intimately dispersed throughout the solution of the phenate. The conditions of temperature and pressure which must be maintained in order to effect the desired absorption depend upon the phenate used and the particular solvent employed. The conditions chosen should be those which insure substantial solubility of the carbon dioxide in the reaction mixture. The absorption may be carried forward at atmospheric pressure, but it is preferred that superatmospheric pressure be employed to increase the solubility of the carbon dioxide in the solution of the phenate. In general, pressures of up to about 2000 p. s. i. g. are satisfactory and pressures of from about 75 to about 600 p. s. i. g. have been found to give excellent results commensurate with ease and smoothness of operation. The temperature at which the reaction mixture must be maintained in order to insure maximum conversion of the phenate in general depends upon the phenate used, the nature of the solvent and the particular pressure employed. The critical factor in all cases is the solubility of carbon dioxide in the reaction mixture. If atmospheric pressure is used the absorption desirably is carried out at temperatures somewhat below the boiling point of the solvent as the absorption of carbon dioxide is slower if it is passed into the boiling liquid. Where superatmospheric pressures are used the temperature may be raised accordingly. In general, satisfactory results are obtained when the temperature of the phenate solution lies between about 100 and about 300° C., the preferred temperature range being from about 120 to about 180° C. At these preferred temperatures it is desirable that the pressure employed lie within the preferred range of from about 75 to about 600 p. s. i. g.

The absorption should continue and should be conducted under such conditions of temperature and pressure that the resulting solution contains at least one molecular equivalent of carbon dioxide per molecular equivalent of phenate present and it is desirable that the solution contain an amount of carbon dioxide substantially in excess of this minimum. It is preferred that the phenate solution be saturated with carbon dioxide under the conditions of temperature and pressure employed.

The solution thus obtained is continuously transferred to a reaction vessel where the desired carboxylation reaction is effected. The reaction may be conducted under approximately the same conditions of temperature and pressure at which the absorption of the carbon dioxide was effected—e. g., the pressure used is within the range of from about atmospheric to about 2000 p. s. i. g. and the temperature, from about 100 to about 300° C. The preferred range of pressure is again from about 75 to about 600 p. s. i. g. and the corresponding desired temperature range is from about 120 to about 180° C. However, while the general range of temperature and pressure under which carbon dioxide absorption is effected also is the general range of temperature and pressure under which carboxylation may be efficiently conducted, it has been found essential that the temperature of the reaction mixture during carboxylation in all cases must never exceed that at which carbon dioxide absorption was effected and it is highly preferable that the carboxylation temperature lie from about 10° C. to about 20° C. lower than the temperature of the absorption system. This temperature difference requirement is necessary in order that the carboxylation reaction can be conducted in a solution that contains at least one molecular equivalent of carbon dioxide per molecular equivalent of phenate, yet which is not saturated with carbon dioxide, thus insuring that the reaction will take place in the system in which no gas phase exists. The solution, which is saturated with carbon dioxide at the higher temperature prevailing in the first, absorption stage, thus will be below saturation at the lowest temperature prevailing in the second, reaction stage, reducing the tendency of the dissolved carbon dioxide to pass out the solution into the gas phase. Further and for the same reason, the pressure maintained in the reactor must be at least equal to the pressure maintained in the absorption system. The pressure in the reactor may be higher than that in the absorber but not lower. The most preferable technique requires that the pressure in both of the stages of the process of the invention be substantially the same.

This emphasis is placed upon the necessity of maintaining a certain pressure and temperature relationship between the reaction system and the carbon dioxide absorption system because it has been found essential to the efficient conduct of the desired reaction to substantial completeness that the carboxylation reaction be carried out in a gas-free system under such conditions that no turbulence exists in the reaction mixture. For this reason it is essential that the carboxylation reaction be effected in a liquid-full reactor the temperature and pressure of which are adjusted as indicated above to provide a reaction medium in which there is at least one molecular equivalent of phenate present and in which the tendency of carbon dioxide to be deabsorbed to the gas phase is minimized. Since this process is a continuous process and the reaction mixture must flow through the reactor it is essential that the rate of flow be so adjusted that the liquid flows through in a substantially laminar, non-turbulent manner. It is also preferable though not essential to the process of the invention that the reactor be so designed that any solid product formed may be removed without disturbing the quiescent nature of the reaction medium.

It is essential to the attainment of practical yields of the desired product that the reaction mixture remain in the reaction zone a sufficient time to allow the reaction to go as near completion as possible. In general, it will be found that the residence time of the reaction mixture in the reactor necessary to insure complete reaction need not exceed about 5 hours and in many cases a residence time of from about 1 hour to about 4 hours is sufficient.

The final product obtained by the process of the invention as outlined above consists of a mixture of the mono- and di-(alkali metal) salts of the desired hydroxy aromatic acid.

The alkali metal salts of the hydroxy carboxylic acids may be used as such, without conversion to the free acid, in the preparation of derivatives of the hydroxy carboxylic acids and of other salts of these hydroxy acids. Thus, alkaline earth metal salts may be prepared by reacting the alkali metal salts with an alkaline earth metal chloride, such as calcium chloride. Further, the basic alkaline earth metal salts may be prepared by reacting the alkali metal salt of the hydroxy carboxylic acid with a mixture of an alkaline earth oxide or hydroxide, such as lime, and an alkaline earth metal chloride, such as calcium chloride.

The alkali metal salts obtained may be converted to the free hydroxy acids by any of the methods known in the art for preparing organic acids from their salts. A suitable method consists in treating the alkali metal salt with an acid, for example, a mineral acid such as sulfuric acid in aqueous solution, and extracting the liberated hydroxy carboxylic acid with an organic solvent, for example, an aliphatic or aromatic hydrocarbon solvent.

The invention is illustrated by the following specific examples. It is to be understood that there is no intention on the part of the inventor of the invention being limited by any details thereof, since many variations may be made within the scope of the claimed invention.

*Example I*

An anhydrous xylene solution containing about 50% by weight of the sodium salts of a mixture of alkyl-substituted phenols obtained by alkylating phenol with a mixture of olefins containing from 14 to 18 carbon atoms per molecule derived by cracking a petroleum fraction was pumped through a preheater to the top of a steam-jacketed absorption column packed with Raschig links. The absorber was operated at a temperature of 160 to 165° C. Dry carbon dioxide gas was introduced into the bottom of the absorption column and it flowed up the column against the flow of the xylene solution. The pressure in the absorption column was 17.5 atmospheres. The solution passing from the bottom of the absorption column, saturated with carbon dioxide, was then passed to the bottom of a cylindrical steam-jacketed reaction vessel set with its axis horizontal. The temperature of the feed entering the reaction vessel was about 100° C. The reaction vessel was operated in "liquid-full" condition at a temperature of 135° C., the pumping rate being adjusted so that the flow through this reactor was maintained under non-turbulent conditions. The pumping rate was such under these conditions that the nominal residence time of the solution in the reactor was 4 hours. The reaction product was released from the reactor to a cooler which was maintained at atmospheric pressure. The carbon dioxide evolved on reduction of the pressure to atmospheric was passed through a gas meter and vented. A sample of the reaction product was taken at hourly intervals over a period of 10 hours. Each sample was acidified, washed and stripped of solvent, and the acid value of the remaining alkyl-substituted salicylic acid was determined. The mean acid value for the continuous process was 59.3 mg. of potassium hydroxide per gram of sample.

*Example II*

Sodium tertiary-octyl salicylate was prepared by carboxylating a solution of sodium p-tert-octyl phenate in methyl isobutyl ketone under conditions similar to those given in Example I. A substantial yield of the desired product was obtained.

I claim as my invention:

1. In a process for preparing an alkali metal salt of an alkyl-substituted hydroxyaromatic carboxylic acid, by absorbing carbon dioxide in a substantially anhydrous solution of an alkyl-substituted alkali metal phenate in a solvent for the said phenate, and thereafter recovering an alkali metal salt of an alkyl-substituted hydroxyaromatic carboxylic acid, the improvement which comprises conducting the reaction in a continuous manner by continuously conducting the adsorption of the carbon dioxide in the solution of the phenate in an absorption zone and continuously passing the resulting mixture in non-turbulent flow in liquid phase and in the absence of any substantial gas phase through a reaction zone maintained in liquid-full condition with the carbon dioxide pressure on the reaction zone being at least equal to the pressure employed in effecting the carbon dioxide absorption and the temperature of the reaction zone not exceeding the temperature of the solution of the phenate in the carbon dioxide absorption zone.

2. The improvement according to claim 1 wherein the temperature in the reaction zone is at least 10° C. below the temperature of the solution in the carbon dioxide absorption zone.

3. The improvement according to claim 1 wherein the alkyl-substituted alkali metal phenate is the sodium phenate of a mixture of alkyl-substituted phenols having 14 to 18 carbon atoms in the alkyl substituent.

4. The improvement according to claim 1 wherein the alkyl-substituted alkali metal phenate is the sodium salt of p-tert-octyl phenol.

References Cited in the file of this patent

UNITED STATES PATENTS

| | | |
|---|---|---|
| 1,951,832 | Luce et al. | Mar. 20, 1934 |
| 2,132,356 | Lecher et al. | Oct. 4, 1938 |
| 2,132,357 | Lecher et al. | Oct. 4, 1938 |
| 2,252,664 | Reiff et al. | Aug. 12, 1941 |